United States Patent [19]

Hayakawa

[11] Patent Number: 5,338,582
[45] Date of Patent: Aug. 16, 1994

[54] PHOTOCONDUCTOR COUPLED LIQUID CRYSTAL LIGHT VALVE

[75] Inventor: Takashi Hayakawa, Nara, Japan

[73] Assignee: Sharp Kabushiki Kaisha, Osaka, Japan

[21] Appl. No.: 118,093

[22] Filed: Sep. 8, 1993

Related U.S. Application Data

[63] Continuation of Ser. No. 849,527, Mar. 11, 1992, abandoned.

[30] Foreign Application Priority Data

Mar. 12, 1991 [JP] Japan .................. 3-046806

[51] Int. Cl.⁵ .......................................... G02F 1/1335
[52] U.S. Cl. .......................................... 428/1; 359/72
[58] Field of Search ............................... 428/1; 359/72

[56] References Cited

U.S. PATENT DOCUMENTS

| | | | |
|---|---|---|---|
| 4,198,647 | 4/1980 | Grinberg et al. | 357/30 |
| 4,538,884 | 9/1985 | Masaki | 350/361 |
| 4,925,276 | 5/1990 | McMurray, Jr. et al. | 359/72 |
| 4,941,735 | 7/1990 | Moddel et al. | 350/342 |
| 5,051,570 | 9/1991 | Tsujikawa et al. | 359/72 |
| 5,085,498 | 2/1992 | Yamamoto et al. | 359/72 |

FOREIGN PATENT DOCUMENTS 0288910 11/1988 European Pat. Off. .
2481521 10/1981 France .

Primary Examiner—Alexander S. Thomas
Attorney, Agent, or Firm—David G. Conlin; George W. Neuner

[57] ABSTRACT

A photoconductor coupled liquid crystal light valve which comprises a pair of substrates opposite to each other, transparent electrodes arranged on each of the substrates, either one having a photoconductive layer and a carrier trapping layer formed over the transparent electrodes, a liquid crystal layer injected between the substrates and a voltage application means between the transparent electrodes.

11 Claims, 5 Drawing Sheets

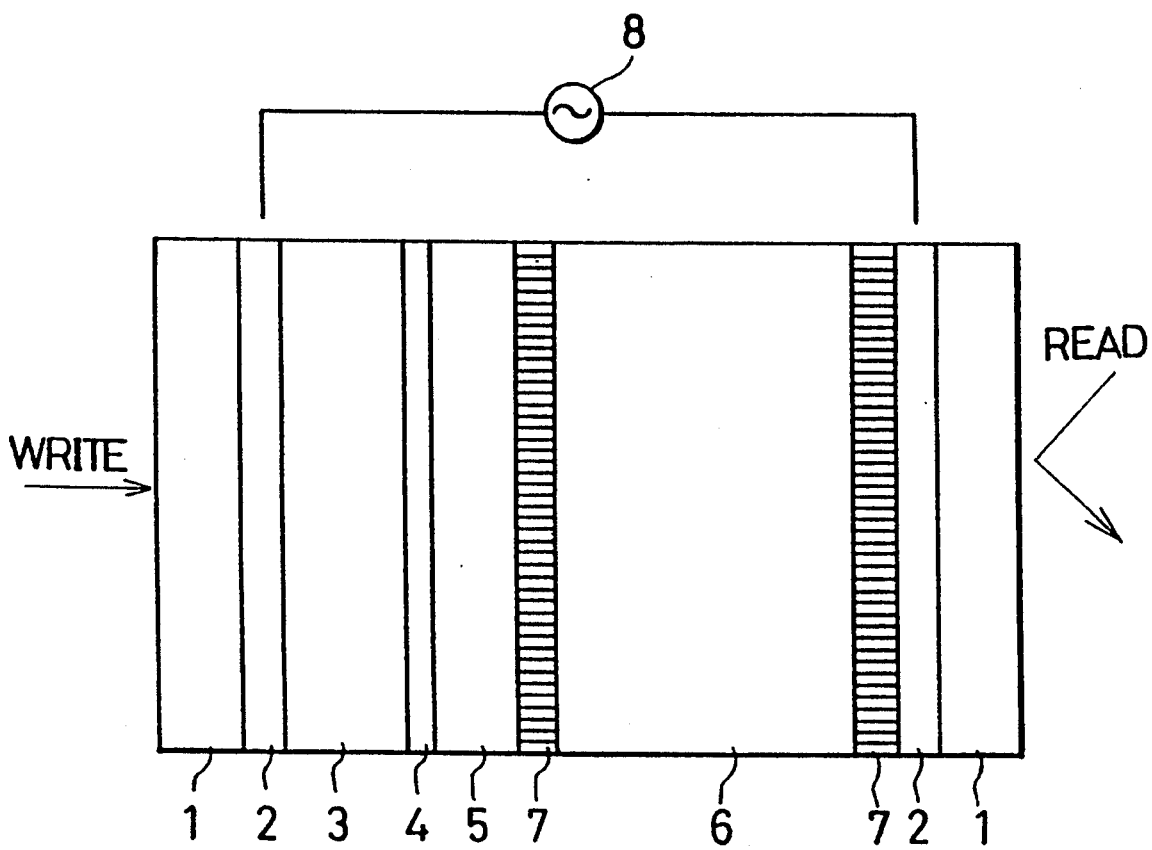
FIG. 1
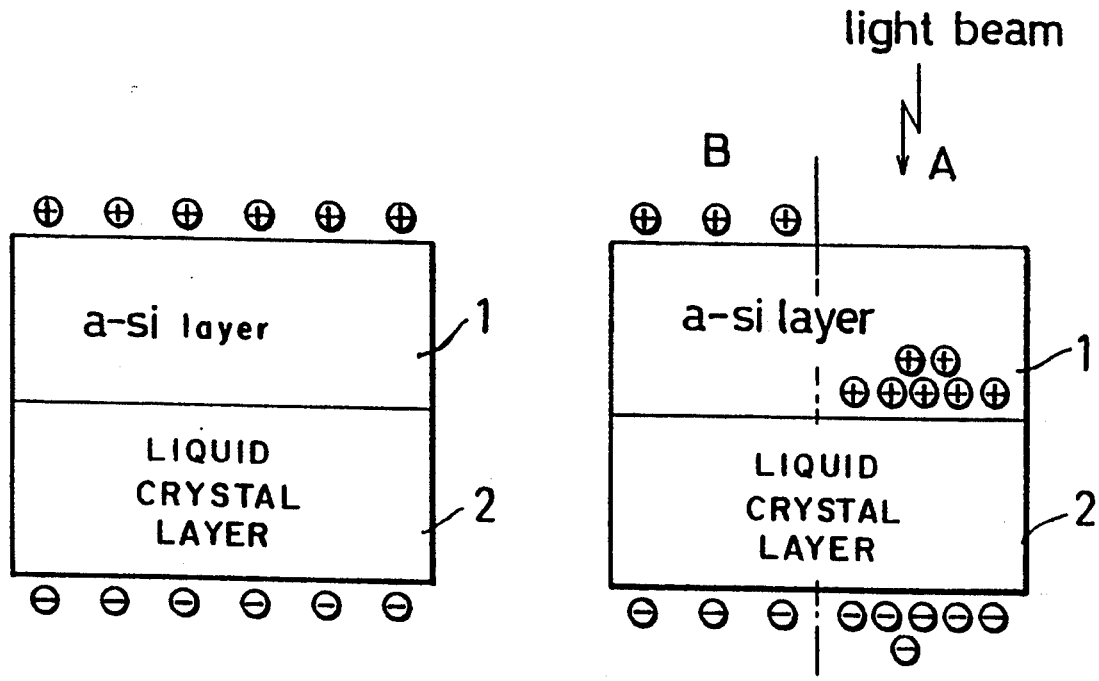
FIG. 2A
FIG. 2B

FIG. 4

| SiH4 amount | B2H6 (0.3% in H2) amount | RF power | PRESSURE | substrate temperature | layer thickness |
|---|---|---|---|---|---|
| 80 (sccm) | 8 (sccm) | 200 (w) | 10⁻⁶ (Torr) | 285 (°C) | 0.5 (μm) |

FIG 3

| SiH4 amount | B2H6 (0.3% in H2) amount | RF power | PRESSURE | substrate temperature | layer thickness |
|---|---|---|---|---|---|
| 80 (sccm) | 0.4 (sccm) | 200 (w) | 10⁻⁶ (Torr) | 285 (°C) | 4 (μm) |

FIG. 5

| SiH4 amount | CH4 amount | B2H6 (0.3% in H2) amount | RF power | PRESSURE | substrate temperature | layer thickness |
|---|---|---|---|---|---|---|
| 80 (sccm) | 8 (sccm) | 25 (sccm) | 200 (W) | 10⁻⁶ (Torr) | 285 (°C) | 0.1 (μm) |

FIG. 6

| SiH4 amount | NH3 amount | B2H6 (0.3% in H2) amount | RF power | PRESSURE | substrate temperature | layer thickness |
|---|---|---|---|---|---|---|
| 80 (sccm) | 12 (sccm) | 50 (sccm) | 200 (W) | 10⁻⁶ (Torr) | 285 (°C) | 0.05 (μm) |

FIG. 7

| SiH4 amount (sccm) | PH3 amount (sccm) | RF power (w) | PRESSURE (Torr) | substrate temperature (°C) |
|---|---|---|---|---|
| 80 | 0.12 | 200 | 10⁻⁶ | 285 |

PH3 is diluted to 0.3% conc with H2

FIG. 8

| SiH4 amount (sccm) | PH3 amount (sccm) | RF power (w) | PRESSURE (Torr) | substrate temperature (°C) |
|---|---|---|---|---|
| 80 | 2.5 | 200 | 10⁻⁶ | 285 |

PH3 is diluted to 0.3% conc with H2

FIG. 9

| SiH4 amount (sccm) | CH4 amount (sccm) | PH3 amount (sccm) | RF power (w) | PRESSURE (Torr) | substrate temperature (°C) |
|---|---|---|---|---|---|
| 80 | 8.0 | 8.0 | 200 | $10^{-6}$ | 285 |

PH3 is diluted to 0.3% conc with H2

FIG. 10

| SiH4 amount (sccm) | NH3 amount (sccm) | PH3 amount (sccm) | RF power (w) | PRESSURE (Torr) | substrate temperature (°C) |
|---|---|---|---|---|---|
| 80 | 12 | 16 | 200 | $10^{-6}$ | 285 |

PH3 is diluted to 0.3% conc with H2

PHOTOCONDUCTOR COUPLED LIQUID CRYSTAL LIGHT VALVE

This is a continuation of copending application(s) Ser. No. 07/849,527 filed on Mar. 11, 1991, now abandoned.

BACKGROUND OF THE INVENTION

1. Field of the Invention

The invention relates to an improvement of a photoconductor coupled liquid crystal light valve utilizing photoconductive effect of a photoconductive layer and electro-optical effect of liquid crystals.

2. Description of the Related Art

In recent years, as a memory device for optical information. a photoconductor coupled liquid crystal light valve utilizing photoconductive effect of a photoconductive layer and electro-optical effect of liquid crystals has been given attention. The photoconductor coupled liquid crystal light valve comprises basically photoconductive layers, a reflection layer, a liquid crystal layer and transparent electrodes sandwiching these layers. Basic function of this device will be detailed hereunder. Voltage is applied to the photoconductive layer and the liquid crystal layer from an outside power source through the transparent electrodes, so that the photoconductive layer and the liquid crystal layer are imposed with the voltages in proportion to electro-resistance of the layers, respectively. When light is riot applied to the device, since electro-resistance of the photoconductive layer is high, the voltage applied to the photoconductive layer and the liquid crystal layer is imposed substantially only on the photoconductive layer while the voltage given to the liquid crystal layer is lower, so that the liquid crystal layer does not produce electro-optical effect. When the light is applied to the device so to write information, electro-resistance of the photoconductive layer decreases, thereby causing to change voltage allocation to the photoconductive layer and the liquid crystal layer. That is, the photoconductive layer which decreases electro-resistance is only applied with lower voltage while the voltage imposed on the liquid crystal layer is higher than the threshold voltage so to bring the electro-optical effect. Hence, when the light contains image information and is applied to the photoconductive layer, it can generate an image pattern on the liquid crystal layer. FIG. 2 (A) shows the state of electric charge on the surfaces of the photoconductive layer 1 and the liquid crystal layer 2 when the device is not applied with light, and FIG. 2(B) that when the right half of the device is applied with light.

In a photoconductor coupled liquid crystal light valve using a material including a photoconductive layer for recording an image pattern, when the light is applied to the photoconductive layer so to write an image, it makes excitation and electric charge (carriers) is generated. The carriers naturally move to an interface between the liquid crystal layer and the photoconductive layer and tend to further shift laterally, thereby causing such problems as deterioration of resolution, deteriorating of image density and partial fragment or stain of images. In detail, when the carriers in the region A at the irradiated right half of the device in FIG. 2(B) partially shift to the non-irradiated left side region B, the region A shortens in the carriers to cause the liquid crystal layer to be subjected to weak electric field, thereby lowering the electro-optical effect, while the liquid crystal layer in the region B is subjected to higher electric field to produce feeble electro-optical effect. As a result, there occurs difference of image density between the regions A and B, or partial fragment of images, leading to an image of poor resolution.

Utilization of amorphous silicon which may contain hydrogen (called hereunder amorphous silicon or a-Si) for the photoconductive layer has been hitherto proposed in such official gazettes as of Japanese Unexamined Patent Applications Nos, 58-34435(1983), 58-34436(1983), 58-199327(1983), 59-81627(1984) and 59-170820(1984). The publications however do not at all cover prevention of the lateral shift of the carriers on the surface of the photoconductive layer in the device.

The present invention has been designed to overcome the above problem. An object of the invention is to provide a photoconductor coupled liquid crystal light valve in which electric charge on the surface of the photoconductive layer prevented from shifting laterally, thereby keeping the excellent image quality.

BRIEF DESCRIPTION OF THE DRAWINGS

FIG. 1 is an explanatory sectional view showing a structure of a photoconductor coupled liquid crystal light valve according to the present invention.

FIGS. 2(A) and 2(B) are schematic diagrams showing the states of electric charge on the surfaces of the photoconductive layer and the liquid crystal layer upon writing images.

FIG. 3 and 4, show examples of conditions for formation of photoconductive layers and a carrier trapping layer.

FIG. 5 shows another condition for formation of the carrier trapping layer.

FIG. 6 shows further modified condition for formation of the carrier trapping layer.

FIGS. 7 through 10 show specific conditions for formation of photoconductive layers and carrier trapping layers in the examples of the present invention, respectively.

SUMMARY OF THE INVENTION

The present invention provides a photoconductor coupled liquid crystal light valve which comprises a pair of substrates opposite to each other, transparent electrodes arranged on each of the substrates, either one having a photoconductive layer and a carrier trapping layer formed over the transparent electrodes, a liquid crystal layer injected between the substrates and a voltage application means between the transparent electrodes.

Preferably, a reflection layer may be formed on the photoconductive layer and further an orientation film may be formed on the photoconductive layer or the reflection layer when used.

On the other hand, an orientation film may be preferably formed on the transparent electrode of another substrate which does not provide a photoconductive layer and carrier trapping layer.

DETAILED DESCRIPTION OF THE PREFERRED EMBODIMENTS

The photoconductive layer may be formed from amorphous silicon doped when required, with an element of the IIIA and VA group to allow the photoconductive layer to be adjustable in electro-resistance or impedance.

The carrier trapping layer may preferably employ amorphous silicon, amorphous silicon nitride or amorphous silicon carbide, those being doped with an element of the IIIA and VA group in higher amount than a doped amount of the photoconductive layer.

When carrier trapping layer comprises amorphous silicon being doped with an element of the IIIA and VA groups in higher amount than a doped amount of the photoconductive layer, it makes Fermi level shift and occupancy ratio in the carrier trapping layer change so to cause the carriers to be further readily caught by the carrier trapping layer.

Here, the elements of the IIIA group are preferably B(boron) or Al(aluminum) and those in VA group are preferably P(phosphorus), N(nitrogen) or As(arsenic).

The present invention provides effects also on a photoconductor coupled liquid crystal light valve which does not inevitably need the orientation films and the reflection layer.

In a photoconductor coupled liquid crystal light valve, when light is applied to the photoconductive layer, the carriers are generated therein and move onto the surface of the photoconductive layer nearer the reflection layer. The carriers on the surface of the photoconductive layer in the conventional devices tend to shift laterally of the surface.

In the present invention, the carrier trapping layer provides on the photoconductive layer, traps the carriers which may reach the surface of the photoconductive layer and prevents the carriers from shifting laterally, so that the carriers can be stayed in a predetermined position to prevent deterioration of images.

FIG. 1 is a example of a sectional view showing a structure of a photoconductor coupled liquid crystal light valve of an example of the present invention. The photoconductor coupled liquid crystal light valve comprises glass substrates 1, 1, and transparent electrodes 2, 2 each provided on the inner surfaces of the glass substrates 1, 1 and sandwiching a photoconductive layer 3, a carrier trapping layer 4, a reflection layer 5 and a liquid crystal layer 6. The liquid crystal layer 6 has orientation films 7, 7 at both sides, and voltage is applied between the transparent electrodes 2, 2 by a voltage application means 8.

Next, a preparation process of the photoconductor coupled liquid crystal light valve will be detailed. ITO (Indium Tin Oxide) was first formed on a transparent glass substrate 1 (e.g. CORNING 7059) by vacuum evaporation system. A glass substrate on which ITO is previously formed may be available. The Glass substrate was set up in a reaction chamber of a plasma CVD system and the reaction chamber was evacuated (about $10^{-6}$ Torr) by a vacuum pumping, and temperature of the substrate was kept at approximate 285° C. SiH$_4$ gas was then fed into the reaction chamber to excite plasma, thereby forming a-Si layer serving as the photoconductive layer. FIG. 3 shows an example of conditions for formation of the a-Si photosensitive layer. In this case, thickness of the photosensitive layer was approximate 4 μm.

When formation of the photosensitive layer 3 was completed, feeding of the material gas was stopped to cause plasma to be dispelled and the reaction chamber was evacuated again at $10^{-6}$ Torr, followed by exciting plasma to deposit the carrier trapping layer under the conditions shown in FIG. 4. In this case, thickness of the carrier trapping layer was approximate 0.5 μm. Further, Si and SiO$_2$ were layered in 10 to 15 layers to form the reflection layer 5, orientation film 7, liquid crystal layer 6, and another orientation film 7 on which ITO film 2 was formed and a glass substrate 1 was set up to complete the photoconductor coupled liquid crystal light valve. In this case, the glass substrate may be available for those on which ITO is formed previously.

Laser beam of approximate 680 nm was applied to the resultant photoconductor coupled liquid crystal light valve from the side nearer the photoconductive layer as shown in FIG. 1 and voltage (approximate 1 KHz, 6 V) was applied between the transparent electrodes 2, 2 to write an image in the liquid crystal layer 6. White light of a halogen lamp was applied to the device from the side nearer the liquid crystal layer 6 to read the written image as shown in FIG. 1. A reproduced image exhibited an excellent resolution without a partial fragment and stain of the image. That is, provision of the carrier trapping layer prevented the lateral shift of electric charge to improve quality of image. The resultant image was erased by applying AC electric field of approximate 10V to the transparent electrodes 2, 2.

The carrier trapping layer may alternatively be available for a-SiC, a-SiN or the like each doped with B (boron) other than the above a-SiH doped with B. FIGS. 5 and 6 show specific conditions for formation of the carrier trapping layer using a-SiC and a-SiN each doped with B, respectively. Thickness of the carrier trapping layer using a-SiC is approximate 0.1 μm and that for a-SiN carrier trapping layer approximate 0.05 μm. A photoconductor coupled liquid crystal light valve having the carrier trapping layer formed under the conditions achieved excellent test results of image formation with reproduced images of high resolution and excellent quality without partial fragment and stain.

Also, a photoconductor coupled liquid crystal light valve, which prepared in the same manner as above except that the photoconductive layer used a-Si (approximate 4 μm) doped with P under the conditions shown in FIG. 7 and the carrier trapping layer employed a-Si (approximate 0.5 μm) under those in FIG. 8, provided a reproduced image of high resolution and excellent quality without partial fragment and stain.

A further modified photoconductor coupled liquid crystal light valve, in which the carrier trapping layer used a-SiC (approximate 0.1 μm) or a-SiN (approximate 0.5 μm) each doped with P under the conditions shown in FIGS. 9 and 10, achieved a reproduced image of high quality as the above cases.

As seen from the above, in the photoconductor coupled liquid crystal light valve according to the present invention, the carriers generated in the photoconductive layer which move toward the reflection layer are well caught by the carrier trapping layer formed on the opposite surface of the photoconductive layer nearer the reflection layer, so that the carriers are prevented from shifting laterally, thereby preventing the deterioration of images and achieving reproduced images of high resolution and excellent quality without partial fragment and stain.

What we claimed is:

1. A photoconductor coupled liquid crystal light valve which comprises a pair of substrates opposite to each other, transparent electrodes arranged on each of the substrates, either one having a photoconductive layer and a carrier trapping layer formed over the transparent electrodes, a liquid crystal layer injected between the substrates and a voltage application means between the transparent electrodes, the carrier trapping layer having a dopant comprising an element selected from group IIIA or VA in an amount higher than present in the photoconductive layer, and the carrier trapping layer being located between the photoconductive layer and the liquid crystal layer.

2. A photoconductor coupled liquid crystal light valve as set forth in claim 1, wherein the photoconductive layer is formed from amorphous silicon which may contain hydrogen.

3. A photoconductor coupled liquid crystal light valve as set forth in claim 1, wherein the photoconductive layer comprises a dopant comprising an element of the IIIA group, and the carrier trapping layer is formed from amorphous silicon which may contain hydrogen and is doped with an element of the IIIA group in an amount higher than the amount of dopant that is present in the photoconductive layer.

4. A photoconductor coupled liquid crystal light valve as set forth in claim 3, wherein the element of the IIIA group is B or Al.

5. A photoconductor coupled liquid crystal light valve as set forth in claim 1, wherein the photoconductive layer comprises a dopant comprising an element of the VA group, and the carrier trapping layer is formed from amorphous silicon which is doped with an element of the VA group in an amount higher than the amount of dopant that is present in the photoconductive layer.

6. A photoconductor coupled liquid crystal light valve as set forth in claim 5, wherein the element of the VA group is P, N or As.

7. A photoconductor coupled liquid crystal light valve as set forth in claim 1, wherein the photoconductive comprises a dopant comprising an element of the IIIA group, and the carrier trapping layer is formed from amorphous silicon nitride or amorphous silicon carbide and is doped with an element of the IIIA group in on amount higher than the amount of dopant that is present in the photoconductive layer.

8. A photoconductor coupled liquid crystal light valve as set forth in claim 1, wherein the photoconductive layer comprising a dopant comprising an element of the VA group, and the carrier trapping layer is formed from amorphous silicon nitride or amorphous silicon carbide and is doped with an element of the VA group in an amount higher than the amount of dopant that is present in the photoconductive layer.

9. A photoconductor coupled liquid crystal light valve set forth in claim 1 in which a reflection layer is formed on the photoconductive layer.

10. A photoconductor coupled liquid crystal light valve set forth in claim 1 in which an orientation film is formed on the photoconductive layer of one substrate and the transparent electrode of another substrate, respectively.

11. A photoconductor coupled liquid crystal light valve set forth in claim 1 in which a reflection layer is formed on the photoconductive layer of one substrate, and an orientation film is formed on the reflection layer and the transparent electrode of another substrate, respectively.

* * * * *